Figure 1:
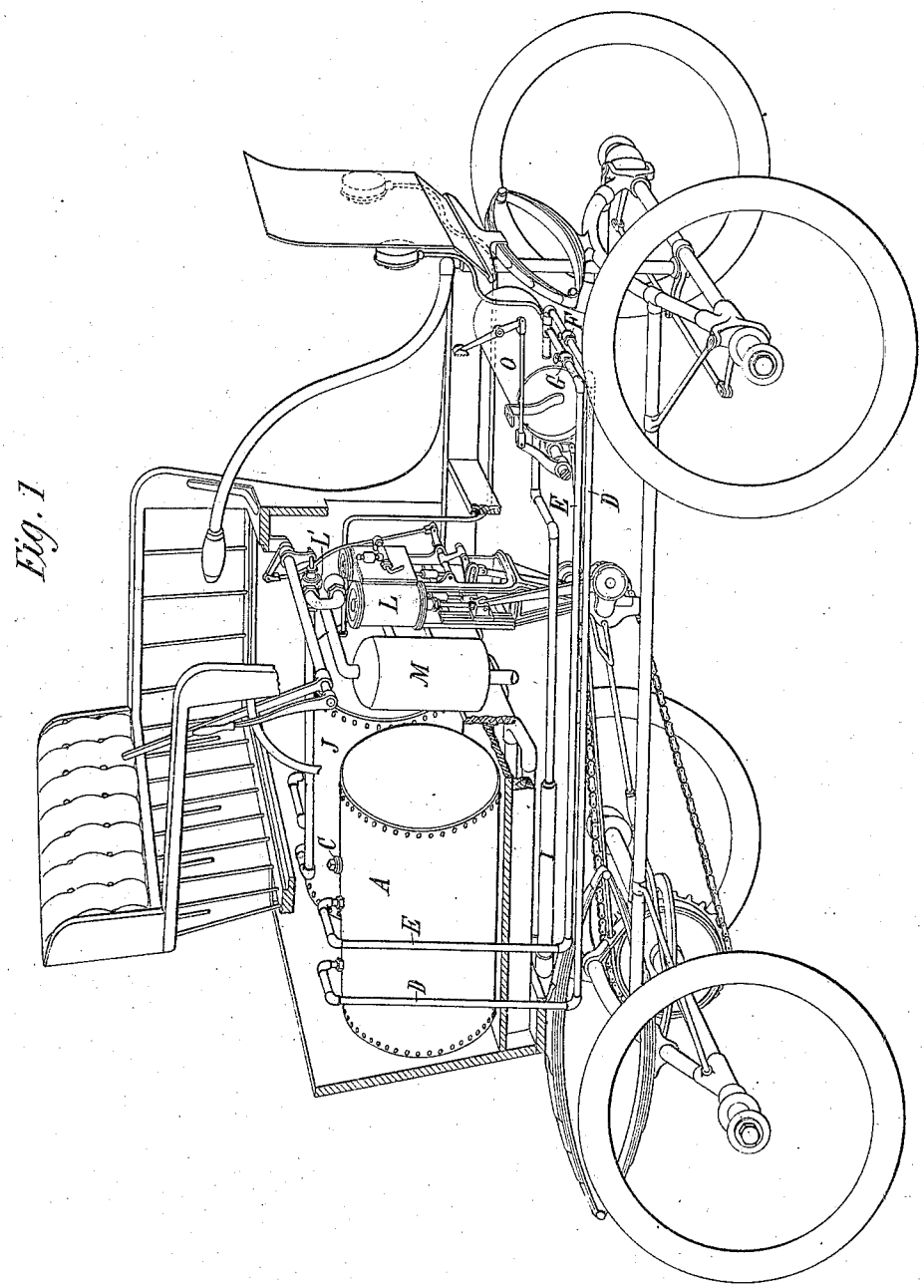

No. 672,256. Patented Apr. 16, 1901.
G. A. BOBRICK.
MEANS FOR UTILIZING LIQUEFIED GASES AS MOTIVE POWER.
(Application filed Sept. 26, 1900.)
(No Model.)
3 Sheets—Sheet 1.

No. 672,256. Patented Apr. 16, 1901.
G. A. BOBRICK.
MEANS FOR UTILIZING LIQUEFIED GASES AS MOTIVE POWER.
(Application filed Sept. 26, 1900.)
(No Model.) 3 Sheets—Sheet 2.

Witnesses:
Raphaël Netter
Benjamin Miller

Gabriel A. Bobrick Inventor
by Kerr, Page & Cooper, Att'ys

UNITED STATES PATENT OFFICE.

GABRIEL A. BOBRICK, OF LOS ANGELES, CALIFORNIA.

MEANS FOR UTILIZING LIQUEFIED GASES AS MOTIVE POWER.

SPECIFICATION forming part of Letters Patent No. 672,256, dated April 16, 1901.

Application filed September 26, 1900. Serial No. 31,149. (No model.)

*To all whom it may concern:*

Be it known that I, GABRIEL A. BOBRICK, a citizen of the United States, residing at Los Angeles, in the county of Los Angeles and State of California, have invented certain new and useful Improvements in Means for Utilizing Liquefied Gases as a Motive Power, of which the following is a specification, reference being had to the drawings accompanying and forming a part of the same.

The object which I have in view in the development of the invention upon which my present application is based is the utilization under thoroughly practicable conditions of liquid air or other gas as a source of motive power for the economical operation of stationary engines, the propulsion of vehicles, and all other purposes in which the expansion of a gas can be profitably converted into mechanical power.

The apparatus which I have devised for carrying out the invention was especially designed to utilize liquid air, nitrogen, oxygen, or carbonic-acid gas, and as either of them may be regarded as typical of those gases which it is mainly my object to employ I shall confine the description of the improvements to liquid-air engines, although it will be understood that the invention is not limited to the use of this medium alone.

The invention consists in a machine or apparatus which is constructed or combined for operation in accordance with a certain principle—viz., the withdrawal from a reservoir of liquid air of the liquid itself in amounts proportionate to the work to be performed and the production of the required pressure by the expansion of such withdrawn liquid in contradistinction to the plan of utilizing the expansion of a considerable body of liquid due to its gradual evaporation by the attraction of heat from the surrounding medium and to bringing it to the temperature of the surrounding atmosphere or heat it artificially to a higher temperature.

To this end the improvement involves the combination, with a receptacle for containing liquid air, and which for convenience may be designated the "boiler," and an engine or motor, of connections one from above and the other from below the level of the liquid in said boiler to coils or chambers into which the liquid is expanded before reaching the engine, these parts being so arranged that the quantity of liquid flowing into the expander is determined by the difference in the pressure in said expander or storage-tank and in the boiler.

The invention also involves numerous features of construction which will be more fully described by reference to the accompanying drawings.

Figure 2:
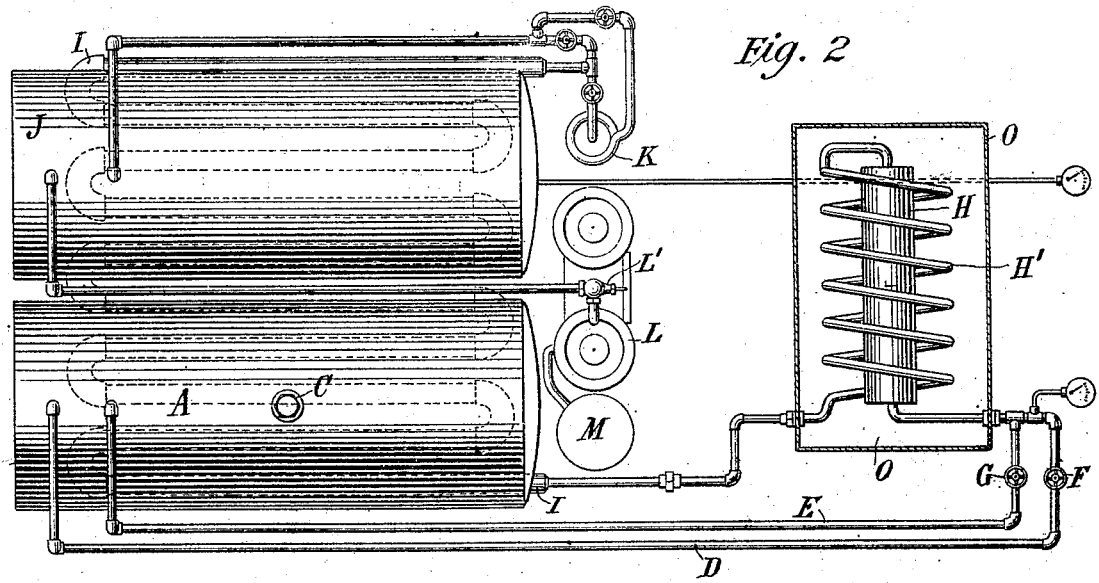
Figure 3:
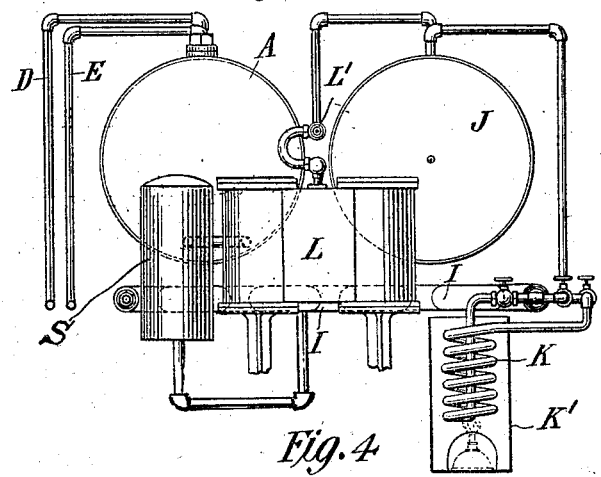
Figure 4:
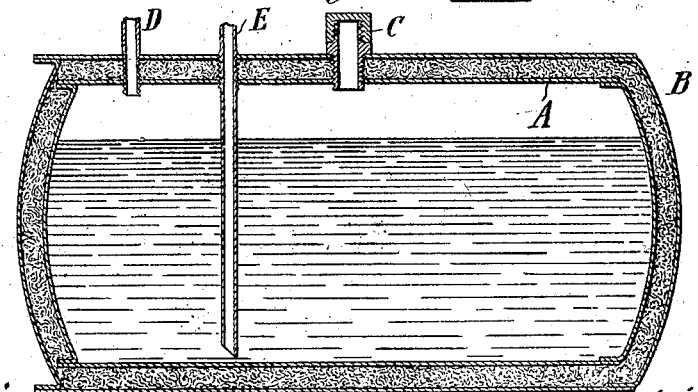
Figure 5:
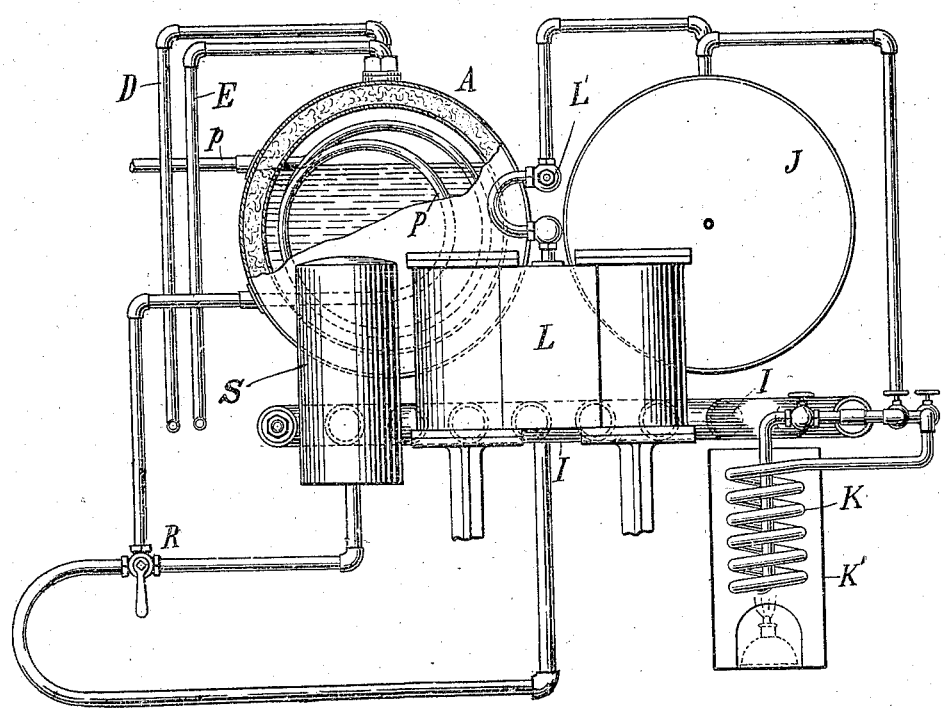

Figure 1 is a perspective view, with parts of the body removed, of an automobile equipped with an engine constructed in accordance with my invention. Fig. 2 is a diagrammatic plan view of the essential parts of the said engine. Fig. 3 is an end view of the same. Fig. 4 is a sectional view of the boiler or receptacle for containing the liquid air. Fig. 5 is a view similar to Fig. 3, showing a modification of the invention.

Referring to the three figures last named, A designates a receptacle which I term the "boiler," of any suitable capacity, made capable of withstanding high pressure and carefully insulated by a jacket B, of any proper material which is a good non-conductor of heat. An opening covered by a screw-cap C is provided for the introduction of the liquid air. From the boiler lead two pipes D and E. The former opens into the upper portion of the interior above the level of the liquid, while the latter extends down nearly to the bottom of the space in which the liquid is contained. In both pipes D and E are valve-couplings and valves F G, by means of which the channels afforded by the pipes may be varied at will. Beyond said valves the two pipes unite before entering an expander, which preferably consists of a cylinder H, surrounded by a return-coil H', the inlet being at the bottom and the outlet at the top, from which the coil H' leads back around the cylinder. The expander H is preferably contained in a tank O, containing water, brine, or a solution of calcium chlorid, although it may be surrounded by any other medium from which heat in proper amounts and at the desired rate may be abstracted. From the expander a pipe leads to a coil I, which is exposed to the atmosphere and in which the air is further expanded by the heat of the atmosphere. The coil I connects with a storage-tank J, either directly or through a vapor-heater K, which is or may be a coil preferably inclosed by a cylindrical casing K', as indicated in Fig. 3, and adapted to be heated by a lamp or otherwise. From the storage-tank J a pipe leads to the engine, (designated by L,) communication therewith being controlled by a throttle-valve L'. The engine exhausts into an ordinary muffler M.

It will be understood that the boiler and storage-tank will be provided with safety-valves and the usual pressure-gages.

The method of operation of the apparatus is as follows: When a given quantity of liquid air has been introduced into the boiler and the violent ebullition produced by the heat taken up from the walls of the latter has ceased, the evaporation of the liquid continues, but at such a slow rate as to render its utilization impracticable, even in cases where uniform pressure is not desirable. If, therefore, the valve G be closed, only a low pressure can be produced in the storage-tank; but if the valve G be opened and valve F closed or partially closed the pressure above the liquid forces a small quantity of the latter up through the pipe E and into the expander, where it is converted into a gas and develops a pressure which will increase in proportion to the volume of liquid which enters the expander.

The apparatus should be so constructed that the expanded air in the storage-tank is maintained at approximately the atmospheric temperature, and this result will be secured by using a volume of water or other liquid in the tank O approximately equal in heat units to be imparted to the liquid air to transform it into a gas at about 32° Fahrenheit.

The pressure is regulated and maintained at any point desired by the valves F and G. As has been before explained, opening F and closing G reduces the pressure, and conversely, and so by the relative adjustment of the two almost any pressure within the normal limits of the apparatus may be steadily maintained until all of the liquid air in the boiler has been expanded and utilized in doing work.

By superheating the air, as is well understood, greater efficiency will be secured; but the superheater may be used or not, as desired.

In order to obtain a more rapid expansion of the air, and consequently higher pressure, the exhaust may be led through a coil P into and through the boiler. This is shown in Fig. 5, where the pipe leading to the said coil is shown as provided with a three-way cock R, by means of which any desired proportion of the exhaust-air may be directed through the coil P.

The above-described means of utilizing liquid air as a motive power lends itself readily to the propulsion of vehicles, although it may be applied to many other purposes. As an illustration of the manner in which I have used such an engine I have shown it in Fig. 1 as mounted on a vehicle such as is commonly styled an "automobile." The principal parts of the apparatus being designated by the same letters of reference as those used on the corresponding elements in the remaining figures, the illustration requires no detailed description to enable it to be clearly understood.

The invention is not limited to the special construction or arrangement of the devices shown and described for purposes of illustration, as these may be varied and modified in many particulars.

What I claim is—

1. The combination with a closed receiver for liquefied air or gas, of an engine or motor, an expander intermediate to the said receiver and the motor and connections between the receiver and expander, one leading from above and the other from below the level of the liquid contained in the receiver, the last-named connection being adapted to permit the transfer of liquid from the receiver to the expander only when the pressure in the receiver exceeds that in the expander and controlling-valves in both connections, as set forth.

2. The combination with a closed receiver for containing liquid air or other gas, of an engine or motor, an expander and a storage-tank intermediate to the said receiver and the motor, and connections between the receiver and expander one leading from above and the other from below the level of liquid in the receiver, the last-named connection being adapted to permit the transfer of liquid from the receiver to the expander only when the pressure in the receiver exceeds that in the expander, and controlling-valves in both connections, as set forth.

3. The combination with a closed receiver for containing liquid air or other gas, of an expander, two pipes connecting the receiver and expander, one leading from above the level of liquid in the receiver, the other leading from below, and extending to a point above said level, and controlling-valves in each pipe, as set forth.

4. The combination with a closed receiver for containing liquid air or other gas, of an expansion chamber or coil, connections between the receiver and coil one leading from above the level of liquid in the receiver and the other from below but extending to a point above said level, a tank for heating liquid in which said expansion-coil is contained and a storage-tank for the expanded gas, connected with the expansion-coil, as set forth.

5. The combination with a closed receiver for containing liquid air, of an expander surrounded by a body, such as water or other liquid of a high specific heat, a coil connected therewith and exposed to the atmosphere, a storage-tank for the expanded air, and connections between the receiver and the expander, one leading from above the level of the liquid in the receiver, and the other from below said level, but adapted to permit the transfer of liquid from the receiver to the expander only when the pressure in the former exceeds that in the latter, as set forth.

6. The combination with a closed receiver for containing liquid air, of an engine or motor, an expander intermediate to the engine and the receiver, connections between the receiver and the expander, one leading from above the level of the liquid in the receiver, and the other from below said level, but adapted to permit the transfer of liquid from the receiver to the expander only when the pressure in the former exceeds that in the latter, and an exhaust-pipe from the engine carried through the liquid and receiver, as set forth.

7. The combination with the boiler A, the engine or motor, the expander and storage-tank J intermediate to the boiler and engine, the pipe D leading from the upper portion of the boiler, the pipe E extending from above the boiler downward to the lower portion of the same, both pipes being connected with the expander, and controlling-valves for the passage afforded by the two pipes, as set forth.

GABRIEL A. BOBRICK.

Witnesses:
 DRURY W. COOPER,
 M. LAWSON DYER.